(12) United States Patent
McKeever et al.

(10) Patent No.: US 12,449,307 B2
(45) Date of Patent: Oct. 21, 2025

(54) MULTI-SLIT CONFIGURED HYPERSPECTRAL IMAGER

(71) Applicant: GHGSat Inc., Montreal (CA)

(72) Inventors: Jason McKeever, Montreal (CA); Antoine Ramier, Montreal (CA); Hanford J. Deglint, Montreal (CA); Dylan Jervis, Montreal (CA); Mathias Strupler, Montreal (CA)

(73) Assignee: GHGSat Inc., Montreal (CA)

( * ) Notice: Subject to any disclaimer, the term of this patent is extended or adjusted under 35 U.S.C. 154(b) by 171 days.

(21) Appl. No.: 18/309,182

(22) Filed: Apr. 28, 2023

(65) Prior Publication Data

US 2023/0349759 A1 Nov. 2, 2023

Related U.S. Application Data

(60) Provisional application No. 63/336,655, filed on Apr. 29, 2022.

(51) Int. Cl.
| | |
|---|---|
| *G01J 3/28* | (2006.01) |
| *G01J 3/02* | (2006.01) |
| *G01N 21/31* | (2006.01) |
| *H04N 23/10* | (2023.01) |
| *H04N 25/78* | (2023.01) |

(52) U.S. Cl.
CPC ........ *G01J 3/2823* (2013.01); *G01J 3/0208* (2013.01); *G01J 3/024* (2013.01); *G01N 21/31* (2013.01); *H04N 23/10* (2023.01); *H04N 25/78* (2023.01)

(58) Field of Classification Search
CPC ....... G01J 2003/2826; G01J 2003/2866; G01J 3/0205; G01J 3/0224; G01J 3/0232; G01J 3/0237; G01J 3/0256; G01J 3/0264; G01J 3/0278; G01J 3/0289; G01J 3/04; G01J 3/06; G01J 3/10; G01J 3/18; G01J 3/28; G01J 3/40; G01J 3/42; G01J 3/433
See application file for complete search history.

(56) References Cited

U.S. PATENT DOCUMENTS

2014/0240514 A1* 8/2014 Love ................... G01J 3/0229
 348/164
2018/0309941 A1* 10/2018 Lopez .................. G01J 3/4531

OTHER PUBLICATIONS

Tang et al., Real-Time Hyperspectral Video Acquisition with Coded Slits, Jan. 21, 2022, Basel (Year: 2022).*

* cited by examiner

*Primary Examiner* — Kara E. Geisel
*Assistant Examiner* — Christina I Xing
(74) *Attorney, Agent, or Firm* — Brion Raffoul

(57) ABSTRACT

Systems and methods relating to a multi-slit hyperspectral imager. The imager is configured with multiple slits that are parallel to one another. Each slit produces its own hyperspectral cube and is limited to a specific wavelength range. The multiple slits produce multiple data sets, obtained in quick succession, for the same section of an area to be imaged. In optical spectrometry applications such as trace gas sensing and quantification, this allows for improved measurement precision. The imager may be used for any gas of interest by adjusting the wavelength range to one that contains absorption features of the targeted gas.

10 Claims, 3 Drawing Sheets

MULTI-SLIT CONFIGURED HYPERSPECTRAL IMAGER

RELATED APPLICATIONS

The present application claims priority to U.S. Provisional Application No. 63/336,655, filed on Apr. 29, 2022, the entirety of which is herein incorporated by reference.

TECHNICAL FIELD

The present invention relates to remote sensing. More specifically, the present invention relates to systems and methods for a hyperspectral imager that is suitable for gathering data related to specific gases.

BACKGROUND

The recent emphasis and concern about climate change has highlighted the need for better and more accurate tracking and assessment of gases in the atmosphere as produced by human activity. To this end, while remote sensing of gases such as methane is well-known and has been practiced for years, the methods and equipment used for such endeavors are sometimes considered as an afterthought.

Classic tracking and measurement of gases escaping from man-made facilities have been accomplished using equipment designed to detect multiple items/artifacts. Such hyperspectral imagers can be used for mapping vegetation, for archaeological sensing, detecting ores in the ground, and, of course, detecting gases. Such wide-ranging uses, while advantageous for manufacturers of the equipment, means that the equipment is not typically optimized for gas detection and characterization. Accordingly, the level of error and accuracy for gas detection and characterization may be less than ideal.

Based on the above, there is a need for systems and methods that reduce the amount of error and increases the accuracy of equipment used for hyperspectral imaging. Preferably, such systems and methods can be optimized for specific uses such as gas characterization and detection.

SUMMARY

The present invention provides systems and methods relating to a multi-slit hyperspectral imager. The imager is configured with multiple slits that are parallel to one another. Each slit produces its own hyperspectral cube and is limited to a specific wavelength range. The multiple slits produce multiple data sets, obtained in quick succession, for the same section of an area to be imaged. In optical spectrometry applications such as trace gas sensing and quantification, this allows for improved measurement precision. The imager may be used for any gas of interest by adjusting the wavelength range to one that contains absorption features of the targeted gas.

In a first aspect, this document discloses a hyperspectral imager comprising:
- a plurality of slit apertures such that a specific portion of a scene is imaged multiple times through said plurality of slit apertures as a platform on which said imager is mounted traverses said scene;
- at least one collimating lens through which images of said specific portion of said scene passes through after being received through at least one of said plurality of slit apertures;
- at least one spectrally dispersive element through which images of said specific portion of said scene passes through after passing through said at least one collimating lens;
- at least one imaging system for refocusing said images of said specific portion of said scene on to a focal plane pixel array; and
- a plurality of pixels on said focal plane pixel array for receiving said images of said specific portion of said scene, wherein
- each slit aperture produces a hyperspectral dataset corresponding to a limited number of specific wavelengths of light received through said slit aperture; and
- each slit aperture corresponds to a fixed number of n pixels of said plurality of pixels such that n<m where m is a maximum number of available pixels.

In a second aspect, the present invention provides a hyperspectral imager comprising:
- a plurality of parallel slit apertures such that a specific portion of a scene is imaged multiple times through said plurality of slit apertures as a platform on which said imager is mounted traverses said scene; and
- a plurality of pixels for receiving split light on a focal plane, said split light resulting from light received through at least one of said plurality of slit apertures, wherein
each slit aperture produces a hyperspectral dataset corresponding to a limited number of specific wavelengths of light received through said slit aperture.

In one embodiment, the spectrally dispersive element is a grating. In another embodiment, the spectrally dispersive element is a prism.

In a further embodiment, the slit apertures are evenly spaced apart from one another. The split apertures may also be parallel to each other. As well, the split apertures may be normal to a direction of travel of said platform.

In another embodiment, the specific wavelengths of light include absorption wavelengths of a specific gas. The specific gas may be methane.

In another aspect, this document discloses a method of hyperspectral imaging, said method comprising:
(a) receiving data from an imaging platform, wherein said imaging platform overflies an area, wherein said imaging platform comprises a hyperspectral imager having multiple slit apertures, and wherein each of said multiple slit apertures provides a separate data stream;
(b) organizing said data into a plurality of datasets, each of said plurality of datasets corresponding to a different one of said multiple slit apertures, such that a number of said plurality of datasets is equal to a number of said multiple slit apertures and each of said plurality of datasets corresponds to a single data stream;
(c) synchronizing said plurality of datasets to thereby produce synchronized data for said area; and
(d) synthesizing said synchronized data to thereby produce a single reading for said area.

In another embodiment, this document discloses a method wherein each slit aperture corresponds to a limited number of specific wavelengths of light received through said slit aperture.

In another embodiment, this document discloses a method wherein said hyperspectral imager further comprises a plurality of pixels for receiving split light on a focal plane, said split light resulting from light received through at least one of said plurality of slit apertures.

In another embodiment, this document discloses a method wherein each slit aperture corresponds to a fixed number of n pixels of said plurality of pixels, such that n<m, where m is a maximum number of available pixels.

In another embodiment, this document discloses a method wherein said multiple slit apertures are parallel to one another in a slit plane.

In another embodiment, this document discloses a method wherein said multiple slit apertures are evenly spaced apart from one another.

In another embodiment, this document discloses a method wherein said multiple slit apertures are normal to a direction of travel of said imaging platform.

In another embodiment, this document discloses a method wherein said specific wavelengths of light include absorption wavelengths of a specific gas.

In another embodiment, this document discloses a method wherein said specific gas is methane.

In another embodiment, this document discloses a method wherein said hyperspectral imager further comprises at least one spectrally dispersive element, said at least one spectrally dispersive element comprising at least one of a grating and a prism.

BRIEF DESCRIPTION OF THE DRAWINGS

The embodiments of the present invention will now be described by reference to the following figures, in which identical reference numerals in different figures indicate identical elements and in which.

DETAILED DESCRIPTION

Figure 1:
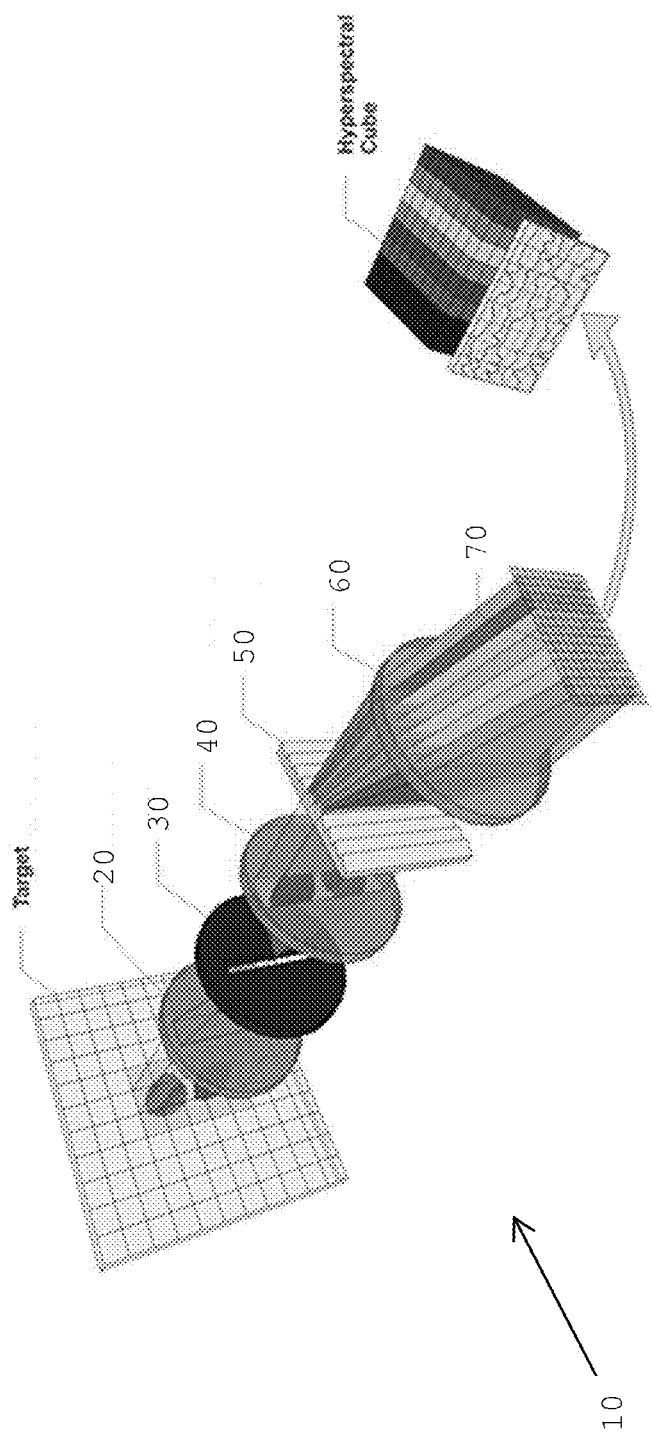
FIG. 1 is a schematic diagram illustrating the general parts of a hyperspectral imager.

A conventional hyperspectral imaging system 10 is illustrated in FIG. 1. As can be seen, a scene to be imaged is scanned and light from the portion of the scene to be imaged is received at a lens 20. The lens 20 focuses the light into a slit 30 and the light entering the slit 30 is then received at a collimating optics 40. A dispersing element/grating 50 then receives the light from the collimating optics 40. The light is dispersed then imaged using imaging optics 60 to finally be received by a sensor 70. The sensor 70 creates a hyperspectral cube from the output with the x-y axes on the cube corresponding to the 2D axes of the imaged scene while the z axis corresponds to different frequencies of light gathered from the imaged scene.

For a number of gas remote sensing applications, the desired performance metric is the detection threshold or the minimum detectable emission from a point source. For a fixed wind speed, this metric is driven primarily by column precision and spatial resolution (i.e., ground sampling distance). It should be clear that the term "column" refers to "column density" (a measure of gas abundance along the optical path). It should also be clear that "column precision" refers to the precision with which the column density is measured.

As will be shown below, the column precision can be improved by using a multi-slit configured hyperspectral imager to reduce the average noise. It should be clear that a multi-slit configured hyperspectral imager is a hyperspectral imager equipped with multiple slit apertures for receiving images of a scene to be imaged.

For the hyperspectral imager according to one aspect of the present invention, the spectral range is fixed to the wavelength range $\lambda_1$ to $\lambda_2$. For this implementation, this part of the spectrum contains absorption features associated with a specific gas of interest. As well, for this implementation, the spectrum gathered for each ground location is dispersed over n pixels of the focal plane array (the sensor 70 in FIG. 1) in the spectral dimension. The set of signals $S_i$ on the pixels is then fit to a model to estimate the column density ($\chi$) of the gas of interest.

It should be clear that the precision of the estimate of the detected column density will depend on the per pixel signal levels, the per pixel noise levels, and the sensitivity of the signals to changes in the column density ($\chi$).

Under certain conditions, the precision $\Delta\chi$ (mol/m2) of the column density estimate can be written as $$\Delta\chi = \sigma/\|J\|$$

where
$\sigma$ is the standard deviation of the per-pixel noise (assumed here to be constant over all pixels i);
J is the Jacobian $$J_i = \frac{\delta S_i}{\delta \chi}$$

where the units are e–/mol m$^{-2}$ and where e– refers to electrons or photoelectrons; and
the double vertical bars represent the 2-norm $$\|J\| = \sqrt{\sum_{i=1}^{n} J_i^2}.$$

Normalizing both the noise and the Jacobian above by the mean signal level gives the following expression:

$$\Delta\chi = \frac{1}{\xi\|\tilde{J}\|}$$

where $\xi = \langle S \rangle/\sigma$ is the signal-to-noise ratio and
$\|\tilde{J}\| = \|J\|/\langle S \rangle$ (with units of 1/(mol m$^{-2}$)) gives the signal sensitivity in a fractional sense to an increase in gas density $\chi$.

This expression can now be evaluated under certain conditions/assumptions. Since the spectral range has been fixed to the range between $\lambda_1$ and $\lambda_2$, and for a given optical configuration, pixel array and integration time t, it can be safely assumed that the total signal (or charge) summed over all pixels i is fixed (Q). Accordingly, for the case of n spectral pixels, $\langle S \rangle = Q/n$ and, in the shot-noise limit ($\sigma = \sqrt{S}$), this results in $\xi = \sqrt{Q/n}$.

Furthermore, without loss of generality, the fractional Jacobian norm can be expressed as:

$$\|\tilde{J}\| = \sqrt{n}\Delta\tilde{J}_n$$

where $\Delta\tilde{J}_n$ is the "rms" of the normalized Jacobian vector $\tilde{J}$. It should be clear that, for large values of n, this quantity is invariant with J. The quantity only drops when the sampling and any associated broadening becomes too coarse to capture the full depth of the absorption features.

Based on the above, this results in $$\Delta\chi = \frac{1}{\xi \|\tilde{J}\|} = \frac{1}{\sqrt{Q}\,\Delta\tilde{J}_n}$$

From this, if the spectrum is spread over fewer pixels n, the precision only starts to suffer when the sampling/broadening causes the Jacobian magnitude $\Delta\tilde{J}_n$ to drop.

For a given set of circumstances (i.e., a given instrument, spectral range, and gas of interest), it is therefore possible that the precision may remain approximately invariant for n well below the total number of available spectral pixels N.

Because of the above, only a subset of the spectral pixels needs to be used. The rest of the spectral pixels can thus be used to repeat the measurement using multiple/additional slits. With additional repeated measurements of the same signal, the noise can be averaged down and, accordingly, column precision can be improved.

If multiple slits are used (e.g., k slits) and when the column error is random (and uncorrelated) for each successive measurement (as is the case with the shot-noise limit), the column precision will scale down as:

$$\Delta\chi_k = \frac{\Delta\chi_1}{\sqrt{k}}$$

where the subscript refers to the number of slits.

From the above, it should be clear that, as k is increased, as long as the Jacobian rms $\Delta\tilde{J}_n$ declines more slowly than the $\sqrt{k}$ dependence, the overall column precision improves. Thus, $\Delta\chi_1$ can increase as fewer pixels are used for each slit, but this expression must increase more slowly than $\sqrt{k}$ for the scheme to be beneficial.

The optimal value for k can be found by modeling and/or experimentation and such a value should provide the lowest value for $\Delta\chi_k$.

Thus, in one aspect, the invention provides a hyperspectral imager configured with multiple parallel slits. The imager may be deployed on a platform that overflies an area to be imaged. Conventionally, each slit is configured to be at right angles to the direction of travel of the platform. As can be imagined, each slit images a section of a scene to be imaged. As the platform overflies the area, each section is repeatedly imaged as each successive slit passes over the section of the scene. This allows each section to be imaged repeatedly over a period of time. The data gathered for each image can then be correlated/aligned such that multiple data sets covering the same section can be overlaid, for example for averaging purposes. It should be clear that, ideally, the period of time over which the section is repeatedly imaged is short enough that an emission plume being imaged stays relatively stable. Preferably, local wind speed and direction do not change during this period of time during which the section is repeatedly imaged.

Figure 2:
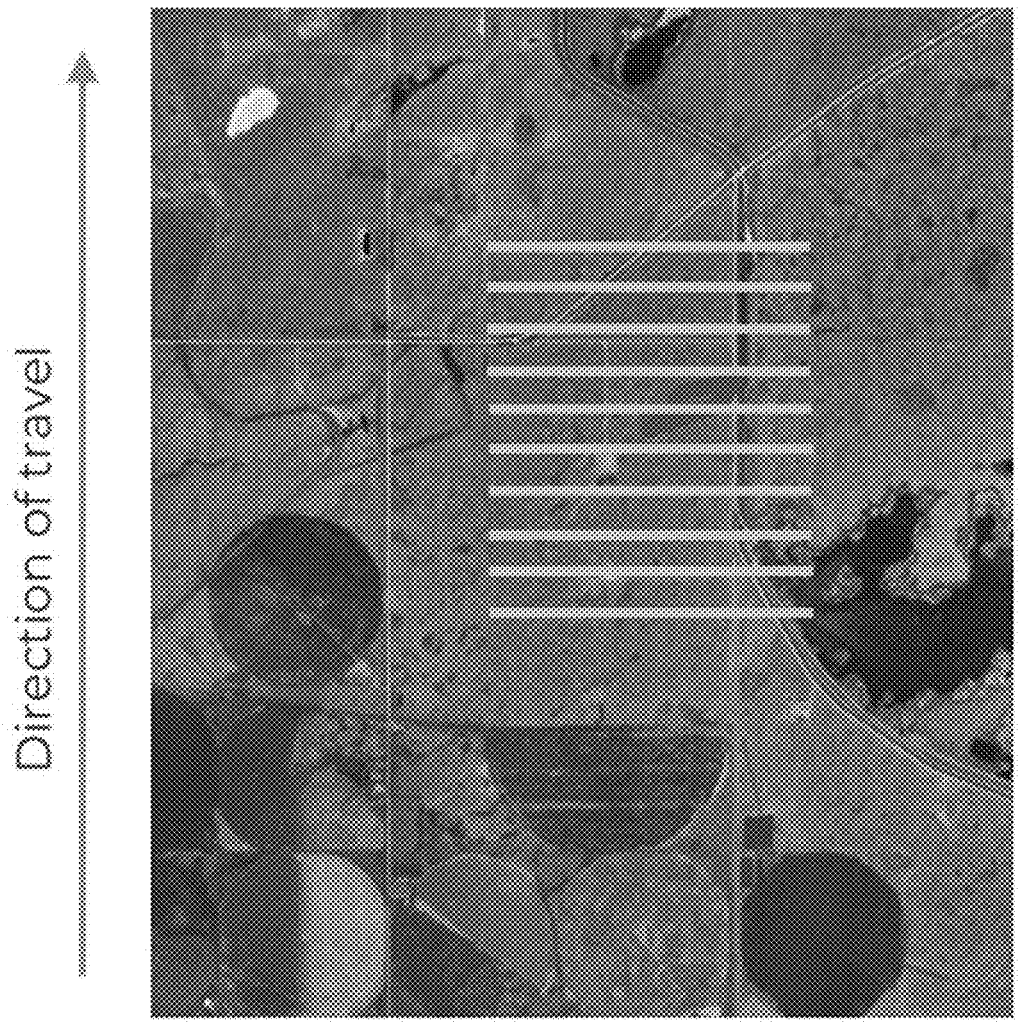
FIG. 2 is an image illustrating a sample area to be imaged and detailing an example configuration of one aspect of the invention using ten slits.

Referring to FIG. 2, illustrated is an area being imaged by a 10 slit hyperspectral imager. The section imaged onto each slit is represented by the cyan lines while an emission plume is represented by the red colored portion in the area. As can be seen from FIG. 2, the slits are all perpendicular to the direction of travel of the platform that the imager is mounted/deployed on. One advantage of the configuration and its multiple datasets is that, once the multiple views/datasets are aligned, the noise for all the measurements can be averaged down while the average plume density is not reduced (assuming that the emission plume has not changed too much).

For gas/plume related applications, as mentioned above, ideally the section of the scene to be imaged is repeatedly imaged over a period of time during which the plume stays relatively stable. As such, implementations in which the scene or a plume is repeatedly imaged over a period of approximately, for example, 15 seconds has been found to provide useful results.

It should be clear that the multiple slits allow the hyperspectral imager to operate as multiple, independent spectrometers, with each slit-based subsystem yielding a time-delayed dataset for the same section of the scene.

Figure 3:
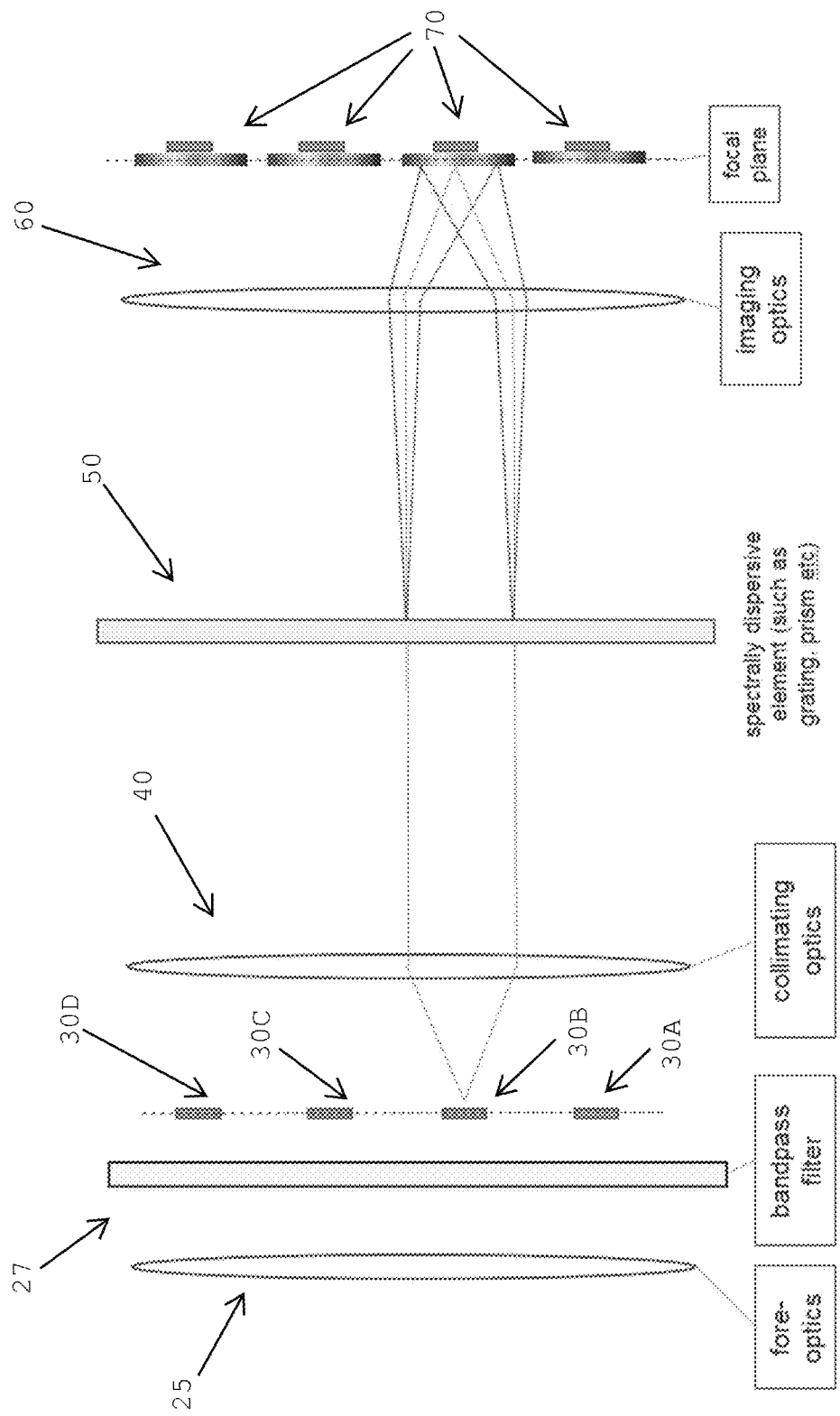
FIG. 3 is a conceptual diagram illustrating the components for implementations of the present invention.

Referring to FIG. 3, illustrated is a schematic configuration of one aspect of the present invention. As can be seen, there are four slits 30A-30D in the configuration and all four share the same collimating optics 40, dispersing element 50, and imaging optics 60. Additionally, between the four slits 30A-30D and the scene to be imaged are fore-optics 25 and a bandpass filter 27. In FIG. 3, the light from the section of the area to be imaged for slit 30B is illustrated as coming from the area, passing through the fore-optics and the bandpass filter and then through the slit 30B, then being received by the collimating optics 40. From the collimating optics 40, the light is dispersed by the dispersing element 50 (a grating or prism as necessary or desirable). The result is then imaged by the imaging optics 60 before being received by the sensor 70 (the pixels) on the focal plane. As each slit overflies a section of the area being imaged, a corresponding section of a hyperspectral datacube is created for that section of the area. Thus, for this implementation, four sections of four hyperspectral datacubes are created with all four sections corresponding to a single section of the area being imaged. Those four sections of the datacubes can then be correlated or synchronized such that four readings of that section are produced. From these four sections of the datacubes, a suitable single reading can be synthesized, the synthesized single reading having a better column precision than what would be obtainable with a single-slit-configured imager.

It should also be clear that, as an example, FIG. 3 shows a "transmissive" dispersive element. Other dispersive elements, such as gratings, are typically reflective, even though transmission gratings do exist. If a reflective grating is used as a dispersive element, the system has to be folded. Reflective gratings can be curved or flat. Other mirrors may also be used (for example, the collimating and imaging optics can be curved mirrors), giving more folds in the system arrangement.

To illustrate the delay between the readings of the different slits in a multi-slit configured imager, suitable parameters for an implementation may be as follows for an aircraft deployed multi-slit imager with 10 evenly spaced slits:

Platform ground speed: 60 m/s

Focal length of 44 mm to produce a 698 m wide swath at a platform height of 3000 m The above parameters will result in an along-track speed of 88 pixels per second with a full spectral dimension of the focal plane array being traversed in 14.5 seconds. Assuming 10 equally/evenly spaced slits, this results in a delay of approximately 1.45 sec between the retrieval fields of successive slits. Thus, in 14.5 sec, 10 simultaneous readings of the swath are performed to result in better-precision spectrometry. It should be clear that the parameters given above simply provide an example implementation and other parameters are, of course, possible.

It should be clear that, while the above implementations discuss targeting methane plumes and methane emissions, other gases may also be targeted. Such targeting can be accomplished by merely adjusting the target frequency range for the hyperspectral datacubes.

Similarly, the multi-slit configured hyperspectral imager may be used for uses other than trace gas sensing and quantification. The multi-slit hyperspectral imager can be used in implementations or fields that can benefit from a better effective SNR. The concept of using multiple slit apertures in parallel may be useful in Raman spectroscopy as well as in LIBS spectroscopy (laser-induced breakdown spectroscopy).

It should be clear that, unless otherwise specified, any references herein to 'image' or to 'images' refer to a digital image or to digital images, comprising pixels or picture cells.

The construction "at least one of [x] and [y]", as used herein, means and should be construed as meaning "[x], [y], or both [x] and [y]".

A person understanding this invention may now conceive of alternative structures and embodiments or variations of the above all of which are intended to fall within the scope of the invention as defined in the claims that follow.

We claim:

1. A hyperspectral imager comprising:
   a plurality of slit apertures such that a specific portion of a scene is imaged multiple times through said plurality of slit apertures as a platform on which said imager is mounted traverses said scene;
   at least one collimating lens through which images of said specific portion of said scene passes through after being received through at least one of said plurality of slit apertures;
   at least one spectrally dispersive element through which images of said specific portion of said scene passes through after passing through said at least one collimating lens;
   at least one imaging system for refocusing said images of said specific portion of said scene on to a focal plane pixel array; and
   a plurality of pixels on said focal plane pixel array for receiving said images of said specific portion of said scene,
   wherein
   each slit aperture produces a hyperspectral dataset corresponding to a limited number of specific wavelengths of light received through said slit aperture, said imager configured to produce a plurality of hyperspectral datasets equal in number to a number of said plurality of slit apertures, wherein each of said plurality of hyperspectral datasets forms a section of a separate hyperspectral datacube; and
   each of said plurality of hyperspectral datasets covers an entirety of said specific portion of said scene;
   said imager further configured to produce a plurality of hyperspectral datacubes, after said scene is imaged, wherein each of said plurality of hyperspectral datacubes is produced by a different slit aperture; and
   each slit aperture corresponds to a fixed number of n pixels of said plurality of pixels such that n<m, where m is a maximum number of available pixels.

2. The imager according to claim 1, wherein said spectrally dispersive element is a grating.

3. The imager according to claim 1, wherein said spectrally dispersive element is a prism.

4. The imager according to claim 1, wherein said slit apertures are evenly spaced apart from one another.

5. The imager according to claim 1, wherein said slit apertures are parallel to each other in a slit plane.

6. The imager according to claim 1, wherein said plurality of slit apertures are normal to a direction of travel of said platform.

7. The imager according to claim 1, wherein said specific wavelengths of light include absorption wavelengths of a specific gas.

8. The imager according to claim 7, wherein said specific gas is methane.

9. A hyperspectral imager comprising:
   a plurality of parallel slit apertures such that a specific portion of a scene is imaged multiple times through said plurality of slit apertures as a platform on which said imager is mounted traverses said scene; and
   a plurality of pixels for receiving split light on a focal plane, said split light resulting from light received through at least one of said plurality of slit apertures,
   wherein
   each slit aperture produces a hyperspectral dataset corresponding to a limited number of specific wavelengths of light received through said slit aperture, said imager configured to produce a plurality of hyperspectral datasets equal in number to a number of said plurality of slit apertures;
   each of said plurality of hyperspectral datasets covers an entirety of said specific portion of said scene; and
   said imager further configured to produce a plurality of hyperspectral datacubes, after said scene is imaged, wherein each of said plurality of hyperspectral datacubes is produced by a different slit aperture.

10. The imager according to claim 9, wherein each slit aperture corresponds to a fixed number of n pixels of said plurality of pixels, n being less than a maximum number of available pixels.

* * * * *